(12) United States Patent  
Yamane

(10) Patent No.: US 6,374,051 B1  
(45) Date of Patent: Apr. 16, 2002

(54) CAMERA HAVING POP-UP STROBE

(75) Inventor: Kenji Yamane, Ohmiya (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 09/587,067

(22) Filed: Jun. 2, 2000

(30) Foreign Application Priority Data

Jun. 3, 1999 (JP) .......................................... 11-156114

(51) Int. Cl.$^7$ ........................ G03B 15/02; G03B 15/06; G03B 15/03
(52) U.S. Cl. ........................ 396/177; 396/175; 396/178; 396/176; 396/62
(58) Field of Search .......................... 396/62, 175, 176, 396/177, 178, 179, 358, 349, 539

(56) References Cited

U.S. PATENT DOCUMENTS 5,652,920 A * 7/1997 Kaihara et al. ................ 396/62  
6,104,882 A * 8/2000 Inazuka ....................... 396/177

FOREIGN PATENT DOCUMENTS

| JP | 03038626 A | 2/1991 |
| JP | 03043721 A | 2/1991 |
| JP | 04199034 A | 7/1992 |
| JP | 06075278 A | 3/1994 |
| JP | 07110512 A | 4/1995 |

* cited by examiner

Primary Examiner—David M. Gray  
Assistant Examiner—Rochelle Blackman  
(74) Attorney, Agent, or Firm—Price, Heneveld, Cooper, DeWitt & Litton

(57) ABSTRACT

There is disclosed a camera in which a power for a pop-up action of a built-in strobe is branched and taken out from & barrel-driving power transmitting path, the barrel is popped up in synchronization with an advancing action of the barrel from a retracted position to a shooting position, and a driving source for the barrel and a driving source for the strobe are from a common source. A first interrupting gear and a second interrupting gear are disposed coaxially and mutually movably in an intermediate portion of the barrel gear train. A following spring is interposed between the first interrupting gear and the second interrupting gear. The first interrupting gear idles in a predetermined range with respect to the second interrupting gear. A lock lever and a lock portion are made such that they can be engaged with and disengaged from each other. The lock lever and the lock portion are engaged with each other when the strobe is popped up by the upward movement of a rack, thereby preventing the strobe from moving in a pop-down direction. The following spring accumulates energy by the turning movement of the first interrupting gear in the pop-down direction, and, when the first interrupting gear is turned beyond a predetermined position, the engagement between the lock lever and the lock portion is released, and the pop-down action is carried out by the accumulated energy of the following spring.

30 Claims, 12 Drawing Sheets

CAMERA HAVING POP-UP STROBE

BACKGROUND OF THE INVENTION

1. Field of the Invention

The present invention relates to a camera having a pop-up strobe for moving a flash light-emitting unit attached to the camera between an irradiation position for shooting and an accommodation position.

2. Description of the Related Art

Some cameras include an electronic flash (strobe) so that many people can enjoy picture taking easily without failure. The strobe is controlled such that it automatically flashes when the subject brightness is insufficient at the time of picture taking. Of this kind of cameras, there is one having a so-called pop-up mechanism in which, if a main-switch or the like is turned ON so as to bring the camera into a picture taking state, a flash light-emitting unit pops up from an upper face of the camera to a light-emitting position and, if the switch is turned OFF, the light-emitting unit pops down into the accommodation position inside the camera body.

Conventionally, as a pop-up driving mechanism of a strobe for a camera including this kind of pop-up mechanism, especially for a camera also including an action mechanism for changing an irradiation angle of a flash light-emitting unit in synchronization with change of a focal length of a lens ("zoom action" hereinafter), there is a pop-up strobe device described in Japanese Patent Laid-Open Publication No. 03038626 A, a retractable zoom strobe device described in Japanese Patent Laid-Open Publication No. 03043721 A, a camera with a built-in strobe is described in Japanese Patent Laid-Open Publication No. 06075278 A, and a camera described in Japanese Patent Laid-Open Publication No. 07110512 A. All of them includes a motor for a strobe only. Japanese Patent Laid-Open Publication No. 04199034 A discloses a camera in which a motor for moving a mirror up and down and for charging a shutter is also used for pop-up operation of a strobe and zooming operation.

Of this kind of cameras, there is one in which a barrel holding a lens can be retracted from a shooting position for taking a picture to a retracted position where the lens is accommodated in a casing of the camera so that the outer size of the camera can be compact when the camera is carried or kept in storage. A powered motor built in the camera is utilized for moving the barrel between the shooting position and the retracted position.

When the strobe is popped up, the flash light-emitting unit moves between the light-emitting position and the accommodating position and thus, a power of a motor can be utilized, and there is a camera in which a motor for driving the strobe is mounted as described above. Especially in a camera in which a lens can change the focal length and flash light-emitting unit also can be zoomed, a strobe-driving motor for popping up the strobe and moving the flash light-emitting unit is mounted as described above.

If a camera separately includes a lens-driving, motor and a strobe-driving motor, the weight of the camera and the size thereof are increased. Further, positions for these motors must be allocated inside the camera, and flexibility in the design of camera is lowered.

In the case of a camera in which a strobe-driving motor is also used for moving up and down the mirror and charging the shutter as the one described in Japanese Patent Laid-open Publication No. H4-199034, since there is no direct relation between these mechanisms, the rotation direction of the motor is changed when the motor is used for driving the strobe and when the motor is used for the mirror. However, when a camera includes a zoom mechanism of a lens, it is preferable if the flash light-emitting unit is popped down when the lens is retracted because these actions can be synchronized.

SUMMARY OF THE INVENTION

Thereupon, it is a first object of the present invention to reduce weight and size of a camera including a retractable barrel and a pop-up mechanism, by using a strobe-driving motor for driving a lens, and popping the strobe up and down in accordance with a retracting action of the barrel.

In order to pop-up the strobe reliably, it is necessary to drive the strobe such that a, sufficient distance is secured for pop-up action. If sufficient distance is secured for pop-up action, there is an adverse possibility that a distance between the shooting position and the retracted position of the barrel is increased. If the distance between the shooting position and the retracted position is increased, a length of optical axis of the camera, i.e., a thickness of the camera is adversely increased.

Thereupon, it is another object of the invention to provide a camera including a pop-up strobe in which the strobe can be popped up utilizing the power of a barrel-driving motor, and the barrel can reliably move between a shooting position and a retracted position.

As technical means for achieving the above object, there is provided a camera including a pop-up strobe, comprising a retracting mechanism for moving a barrel between a retracted position and a shooting position by a power output from a driving source, a pop-up mechanism for moving a flash light-emitting unit between an accommodated position and an irradiating position, power branching means provided in an intermediate portion of a barrel-power transmitting path between the driving source to the barrel, and a pop-up power transmitting path for transmitting a power of the driving source from the power branching means to a driving mechanism of the pop-up mechanism.

For example, in the case of a structure in which an output of the driving source is transmitted to the barrel through the power transmitting path comprising a gear train, an appropriate gear constituting the gear train is meshed with another gear as power branching means, and the driving force for the pop-up mechanism of the strobe is obtained from this other gear. Further, the pop-up action is carried out when the barrel is advanced to the shooting position, and the pop-down action is carried out when the barrel is retracted to the retracted position. Therefore, the retracting action of the barrel and the pop-up action of the flash light-emitting unit can be synchronized.

According to a second aspect of the invention, there is provided a camera, including a pop-up strobe, comprising a retracting mechanism for moving a barrel between a retracted position and a shooting position by a power output from a driving source, a pop-up mechanism for moving a flash light-emitting unit between an accommodated position and an irradiating position, power branching means provided in an intermediate portion of a barrel-power transmitting path between the driving source to the barrel, and a pop-up power transmitting path for transmitting a power of the driving source from the power branching means to a driving mechanism of the pop-up mechanism, wherein when the barrel is moved from the retracted position to the shooting position, the barrel is further moved forward from the shooting position, a pop-up action for moving the flash light-emitting unit from the accommodated position to the irradiating position is carried out, and, after the pop-up action is completed, the barrel is retracted and moved to the shooting position.

As described above, it is preferable to reduce the movement amount of the barrel between the retracted position and the shooting position in order to make the camera thinner. However, if the moving amount from retracted position to the shooting position is reduced, there is an adverse possibility that a sufficient moving amount for pop-up action cannot be obtained. Thereupon, the barrel is further advanced forward from the shooting position to increase the moving amount, and the pop-up action is carried out utilizing this moving amount. Thereafter, the barrel is retracted to the shooting position to bring the camera into the shootable state. If the pop-up mechanism of the strobe is provided with appropriate engaging/disengaging means so that the power caused by the retracting action to the shooting position of the barrel is not transmitted the strobe by the action of the engaging/disengaging means in a state in which the pop-up is completed, the flash light-emitting unit maintains the irradiating position. The flash light-emitting unit is biased in a pop-down direction by the biasing means, the action of the engaging/disengaging means is released halfway through the retracting movement of the barrel to the retracted position, this biasing force is applied to the flash light-emitting unit, and the flash light-emitting unit is brought to the accommodated position. With this arrangement, the pop-up and pop-down action can reliably be carried out.

According to a third aspect of the invention, there is provided a camera including a pop-up strobe comprising a zoom lens device including a retracting mechanism for moving a barrel between a retracted position, a wide-angle shooting position and a telephotograph shooting position by a power output from a driving source, a pop-up mechanism for moving a flash light-emitting unit between an accommodated position and an irradiating position, power branching means provided in an intermediate portion of a barrel-power transmitting path between the driving source to the barrel, and a pop-up power transmitting path for transmitting a power of the driving source from the power branching means to a driving mechanism of the pop-up mechanism, wherein when the barrel is moved from the retracted position to the wide-angle shooting position. The barrel is further moved forward from the wide-angle shooting position, a pop-up action for moving the flash light-emitting unit from the accommodated position to the irradiating position is carried out, and, after the pop-up action is completed, the barrel is retracted and moved to the wide-angle shooting position.

When the strobe is popped up, the barrel in the retracted position is slightly advanced beyond the shooting position and then, the barrel is retracted to the shooting position. An advancing/retracting mechanism of the barrel for advancing the barrel from the shooting position and then retracting the barrel is complicated in structure, and in the case of a camera having tie retracting mechanism provided with a unifocal lens device which has a merit of simple structure, if the camera is provided w the advancing/retracting mechanism; its merit is lost. On the other hand, in the case of a camera having a zoom lens device, the barrel is advanced from the retracted position to the wide-angle shooting position, and it is advanced and retracted between the wide-angle shooting position and the telephotograph shooting position by the zoom action. Therefore, it is unnecessary to separately prepare the advancing/retracting mechanism which advances the barrel from the retracted position beyond the wide-angle shooting position and then retract the barrel to the wide-angle shooting position.

According to a fourth aspect of the invention, a constituent element of the pop-up power transmitting path is provided with power accumulating means, the power accumulating means accumulates a power halfway through the pop-up action, and when the barrel is popped down from the irradiating position to the accommodated position, the pop-down action is carried out by the accumulated power.

As described above, it can be biased against the flash light-emitting unit by the biasing means but in this case, it is always biased, and, when a coil spring is utilized, for example, there is an adverse possibility that a desired action cannot be obtained because of fatigue. If, however, the power is accumulated at the time of pop-up action, the desired action is not prevented from being obtained by the fatigue even if the power accumulating means comprises a coil spring because the coil spring is usually in its natural length state. Further, since the pop-down action is carried out by the accumulated power, the pop-down action can be carried out irrespective of the moving amount of the barrel. Even if the distance between the retracted position and the shooting position is shortened for reducing the thickness of the camera, the pop-down action can reliably be carried out. The moving amount of the barrel can be reduced to a minimum by combining the invention of the fourth aspect with the second or the third aspect.

According to a fifth aspect of the invention, the camera further comprises a pair of interrupting power transmitting elements which are provided in the pop-up power transmitting path, and which are capable of relatively move and mutually transmitting a moving power, non-interference means for cutting a transmission of the moving force between the pair of interrupting power transmitting elements, and moving-preventing means for preventing a second interrupting power transmitting element of the pair of interrupting power transmitting elements disposed closer to the flash light-emitting unit from moving in a predetermined direction, wherein the power accumulating means is interposed between the pair of interrupting power transmitting elements, when a first interrupting power transmitting element disposed closer to the power branching means is moved from its original position to a second position in a normal direction, the second interrupting power transmitting element is moved from its original position to a second position, and the flash light-emitting unit is moved to the irradiating position, the second interrupting power transmitting element is prevented from moving toward the original position by the moving-preventing means in a state in which the second interrupting power transmitting element is in the second position. The power accumulating means accumulates power by moving the first interrupting power transmitting element from the second position to a first position in the opposite direction, a moving-preventing operation of the moving-preventing means is acting, a movement of the first interrupting power transmitting element from the first position to the second position transmitted to the second interrupting power transmitting element by the non-interference means, a restraint of the second interrupting power transmitting element by the moving-preventing means is released by moving the first interrupting power transmitting element from the first position toward the original position in the opposite direction, thereby allowing the second interrupting power transmitting element to move, the flash light-emitting unit is moved to the accommodated position by the power accumulating means, in a state in which the first interrupting power transmitting element and the second interrupting power transmitting element are in their original positions, the barrel is in the retracted position, and the flash light-emitting unit is in the accommodated position, and the camera is brought into a shootable state when the first interrupting power transmitting element is in the first position.

If the barrel is moved from the retracted position to the wide-angle shooting position in the case of a camera having a zoom lens device or other variable focus lens, or to the shooting position, i.e., forward in the case of a camera having a short focus lens, its power is transmitted to the first interrupting power transmitting element through the power branching means, and the first interrupting power transmitting element is moved from the original position in the normal direction. At that time, the second interrupting power transmitting element is also moved from the original position in the same direction together with the first interrupting power transmitting element, thereby moving the flash light-emitting unit from the accommodated position to the irradiating position. If the barrel advances to an appropriate position beyond the wide-angle shooting position or the shooting position, the first and second interrupting power transmitting element move to the second positions, and the flash light-emitting unit comes to the irradiating position. The moving-preventing means is connected to the second interrupting power transmitting element located in the second position, and the second interrupting power transmitting element is prevented from moving toward the original position. If the barrel is retracted to the wide-angle shooting position or the shooting position, the first interrupting power transmitting element moves from the second position and comes to the first position. At that time, the power is accumulated in the power accumulating means. On the other hand, since the second interrupting power transmitting element is maintained in the second position, the flash light-emitting unit is maintained in the irradiating position and thus, the strobe shooting can be carried out.

If the barrel is retracted from the wide-angle shooting position or the shooting position to the retracted position, the first interrupting power transmitting element moves from the first position to the original position. Since the restriction by the moving-preventing means is released halfway through this movement, the second interrupting power transmitting element is set free. Further, since the power for moving toward the original position is applied to the second interrupting power transmitting element by the power accumulating means, the second interrupting power transmitting element moves to the original position by this biasing force. At that time, the barrel is in the wide-angle shooting position or the shooting position, and the camera is brought into the shootable state.

According to a sixth aspect of the invention, the pair of interrupting power transmitting elements comprise power transmitting elements which are capable of turning mutually and coaxially. That is, the interrupting power transmitting elements may be capable of mutually sliding straight but, when the barrel-power transmitting path comprises a gear train, the rotating force is obtained from the power branching means. Therefore, in order to transmit this rotating force to the driving mechanism of the pop-up mechanism efficiently, it is preferable that the pop-up power transmitting path also comprises a gear train. When this structure is employed, it is preferable that the interrupting power transmitting element can also turn because the structure is simplified, and if the transmitting element can turn, the installation space is reduced, which is advantageous for reducing the camera in size.

According to a seventh aspect of the invention, one of the pair of interrupting power transmitting elements is provided with a projection. The other is provided with a receiving groove for accommodating the projection, and the non-interference means does not transmit the power between the interrupting power transmitting elements when the projection is not in engagement with any of ends of the receiving groove. Since the non-interference means comprises the combination of the projection and the receiving groove, the power can be transmitted reliably with such a structure.

According to an eighth aspect of the invention, the power accumulating means comprises a torsion coil spring whose opposite ends are respectively engaged with ends of the interrupting power transmitting elements. When the pair of interrupting power transmitting elements can turn mutually, the torsion coil spring is connected between both the elements. If one of the transmitting element is fixed and the other is turned, the torsion coil spring is twisted and resilience is accumulated. Therefore, if the fixed state of the one transmitting element is released, this transmitting element is turned in the same direction as the other transmitting element.

According to a ninth aspect of the invention, there is provided a pop-up method of a strobe of a camera having a pop-up strobe, wherein when a retracting action for moving a barrel between a retracted position and a shooting position by a power output from a driving source is carried out, a pop-up action for moving a flash light-emitting unit from an accommodated position to an irradiating position is carried out in synchronization with the moving action of the barrel. If the barrel is moved from the retracted position to the shooting position, the flash light-emitting unit, is popped up to the retracted position in synchronization with this moving action. If the barrel is moved from the shooting position to the retracted position, the flash light-emitting unit is popped down to the accommodated position.

According to a tenth aspect of the invention, there is provided a pop-up method of a strobe of a camera having a pop-up strobe, wherein a retracting action for moving a barrel between a retracted position and a shooting position by a power output from a driving source is carried out, a pop-up action for moving a flash light-emitting unit from an accommodated position to an irradiating position is carried out in synchronization with the moving action of the barrel, when the barrel is moved to a shooting position, the barrel is advanced slightly from the shooting position, the flash light-emitting unit is moved to the irradiating position with this advancing action and then, the barrel is retracted to the shooting position. When the camera is brought into the shootable state, the barrel moves beyond the shooting position. The strobe can reliably pop up by this moving distance. Thereafter, if the barrel is moved to the shooting position, the camera can be used for shooting in a state in which the strobe is popped up.

These and other features, objects, and advantages of the present invention will become apparent upon reading the following description thereof together with reference to the accompanying drawings.

DETAILED DESCRIPTION OF THE EMBODIMENTS

A camera including a pop-up strobe of the present invention will be explained below concretely based on an illustrated preferred embodiment. This embodiment shows a case in which a motor for carrying out a zoom action in agreement with a pop-up action is mounted in the camera. A mechanism for carrying out a zoom action will also be explained together with a pop-up mechanism.

Figure 1:
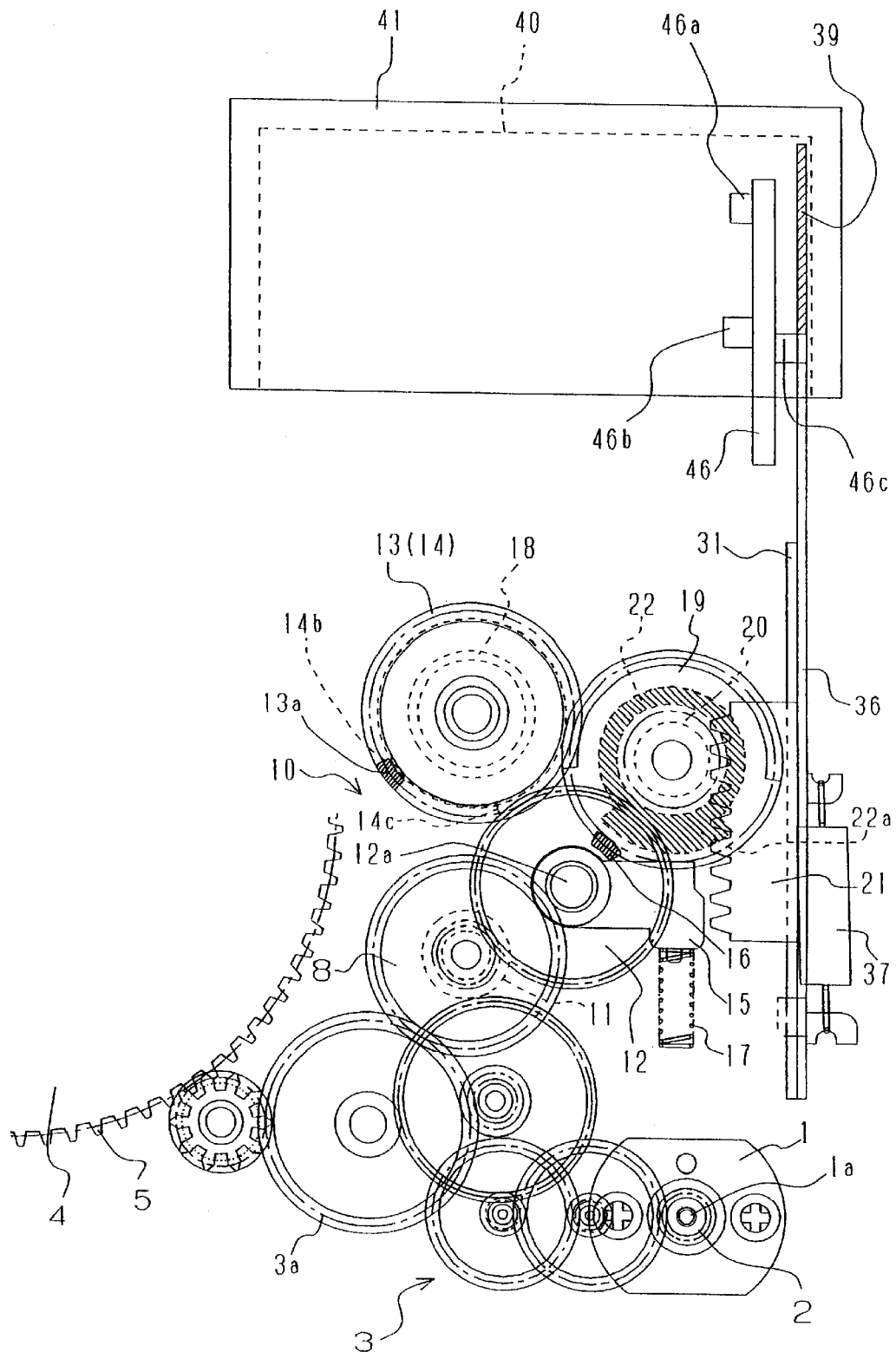
FIG. 1 is a schematic front view showing the structure of a camera including a pop-up strobe according to the present invention.

FIG. 1 is a schematic front view showing the structure of a camera including a pop-up strobe according to the present invention. The power of a barrel motor 1 as a driving source disposed in a lower portion of a camera body is transmitted to a barrel driving gear 5 provided on an outer peripheral face of a barrel 4 from a driving gear 2 fitted to an output shaft 1a through an appropriate gear train 3 constituting a barrel-power transmitting path. As the barrel 4 is turned around the optical axis, a predetermined barrel is retracted in the optical axis direction through an appropriate mechanism such as a cam mechanism, thereby moving the lens in the same direction. This moving range is between a retracted position where the lens cannot be used for shooting and a position where the lens can be used for shooting, and between a wide-angle shooting position, where the focal length is short and a telephotograph shooting position where the focal length is long, and the barrel comes the forefront position.

A branch gear 8 constituting power branching means is meshed with a gear 3a constituting the gear train 3. A gear train 10 constituting a pop-up mechanism is connected to the branch gear 8. A transmitting gear 12 is meshed with an input gear 11 which is coaxial with the branch gear 8, a first interrupting gear 13 constituting a first interrupting power transmitting element is meshed with the transmitting gear 12. A second interrupting gear 14 constituting a second interrupting power transmitting element is provided coaxially with the first interrupting gear 13. The first interrupting gear 13 and the second interrupting gear 14 are supported such that they can be turned together.

Figure 2:
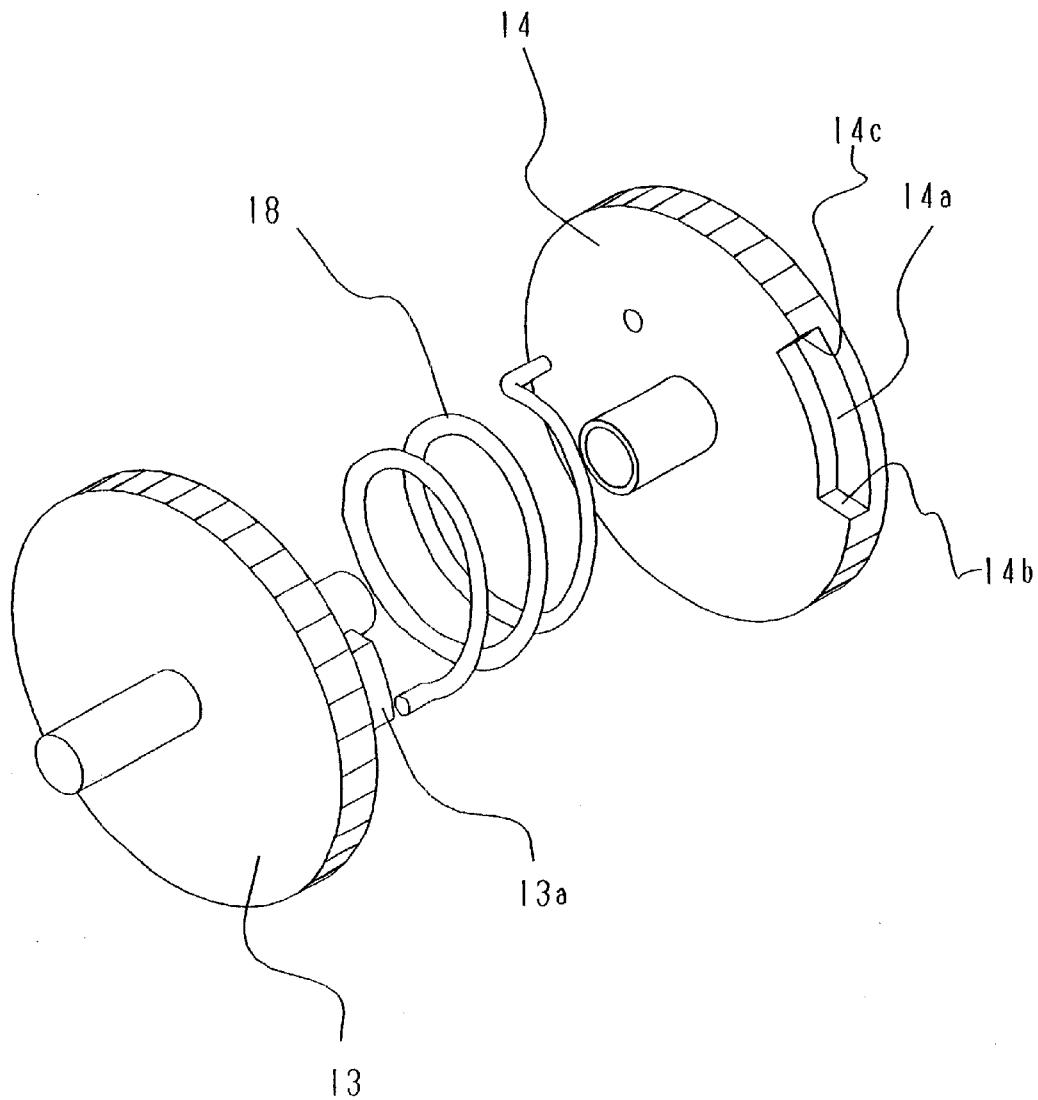
FIG. 2 is an enlarged schematic exploded perspective view showing the structure of an essential portion of a driving mechanism of the pop-up strobe.

A lock lever 15 constituting moving-preventing means is turnably supported by a turning shaft 12a of the transmitting gear 12. The transmitting gear 12 is provided at its side with a releasing projection 16 which is engaged with and disengaged from the lock lever 15 by the turning motion of the transmitting gear 12. The lock lever 15 can turn in an undermentioned direction by resilience of a pushing spring 17 comprising a compression coil spring. As shown in FIG. 2, a following spring 18 comprising a torsion spring constituting power accumulating means is interposed between the first interrupting gear 13 and the second interrupting gear 14. An end of the following spring 18 is locked to the first interrupting gear 13 and the second interrupting gear 14. Therefore, if the first interrupting gear 13 is turned in a state where the second interrupting gear 14 is fixed, the following spring 18 is twisted and the resilience is accumulated. At that time, if the fixed state of the second interrupting gear 14 is released, the second interrupting gear 14 is turned in the same direction in which the first interrupting gear 13 was turned. An engaging projection 13a projects from a face of the first interrupting gear 13 opposed to the second interrupting gear 14. On the other hand, an arc receiving groove 14a having appropriate length for receiving the engaging projection 13a is formed in a face of the second interrupting gear 14 opposed to the first interrupting gear 13, thereby forming dead band means. That is, when the engaging projection 13a is moved in the receiving groove 14a, a turning force is not transmitted between the first interrupting gear 13 and the second interrupting gear 14. When the engaging projection 13a abuts against any one of end edges 14b and 14c, a turning force in a direction in which the engaging projection 13a pushes the one of the end edges or in a direction in which the one of the end edges pushes the engaging projection 13a is transmitted.

As shown in FIG. 1, a control gear 19 is meshed with the second interrupting gear 14, a driving gear 20 which is rotated in unison with the control gear 19 is provided coaxially with the control gear 19. A rack 21 is meshed with the driving gear 20, and the rack 21 is straightly moved if the driving gear 20 is turned. The control gear 19 is provided at its side with a lock plate 22 which is circular around a turning shaft of the control gear 19. The lock plate 22 includes a lock portion 22a which is partially expanded into a fan-shape to constitute moving-preventing means. The lock lever 15 receives the resilience of the pushing spring 17 to enter a turning region of the lock portion 22a.

As shown in FIG. 1 and FIGS. 7 to 9, the rack 21 is provided on an exchanging plate 31 which is slidably supported in the vertical direction as viewed in FIG. 1. The exchanging plate 31 is formed with a pair of long guide holes 31a arranged vertically, whose longitudinal direction is along a sliding direction of the exchanging plate 31. Guide pins 32 embedded in the camera body are loosely inserted through the guide holes 31a.

Figure 7:
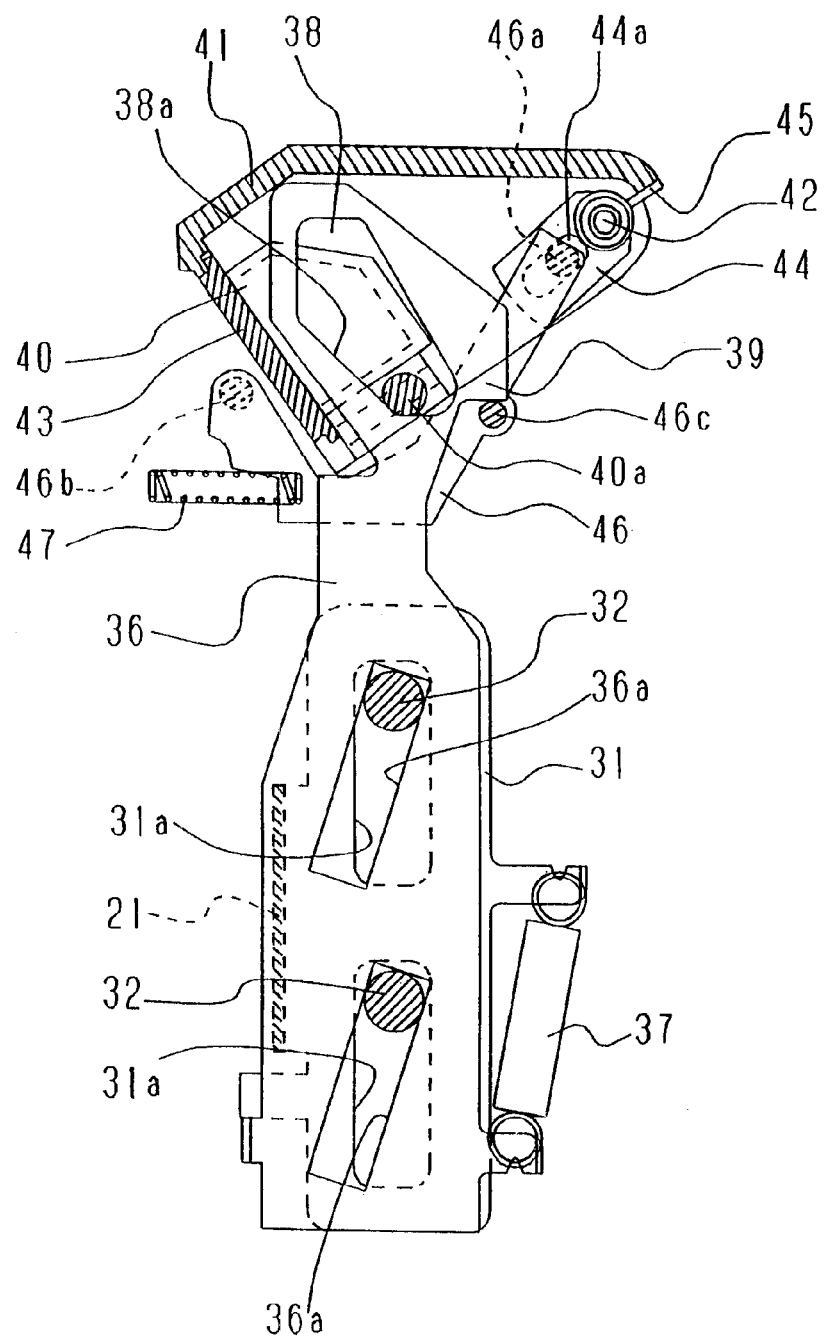
FIG. 7 is a schematic front view showing the pop-up action of the pop-up mechanism and showing a state in which the barrel is retracted.
Figure 9:
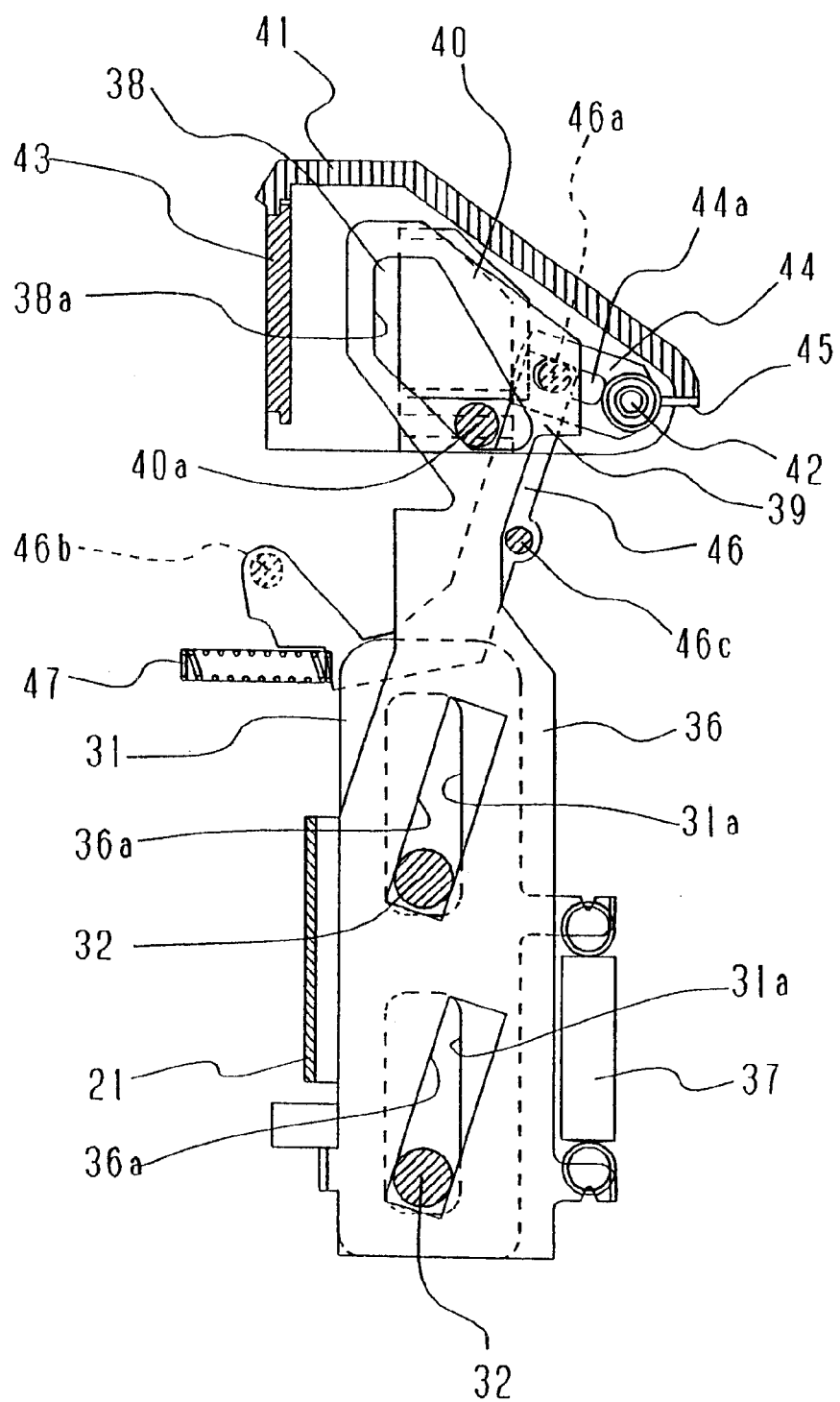
FIG. 9 is a side view showing the zoom action of the pop-up mechanism and showing a state in which the barrel is in the shooting position on the long focus side.

A driving plate 36 is provided such as to be superposed on the exchanging plate 31. As shown in FIGS. 7 and 9, a pair of driving holes 36a, whose longitudinal direction is along a direction appropriately inclined with respect to the guide holes 31a, are formed in the driving plate 36. The guide pins 32 are also loosely inserted through the driving holes 36a.

An extension spring 37 is stretched between the exchanging plate 31 and the driving plate 36.

An upper portion of the driving plate 36 is extended upward, and the upper portion is provided with a cam 39 formed with a cam hole 38. The cam 39 is located on a side portion of a flash light-emitting unit 40. The flash light-emitting unit 40 is accommodated in a strobe casing 41 turnably supported around a supporting shaft 42 on a rear side of the camera body, and a light-emitting window 43 is mounted to the strobe casing 41 at the front side. The flash light-emitting unit 40 is popped up and down by the turning motion of the strobe casing 41 around the supporting shaft 42. In a pop-down state, a back side of the strobe casing 41 is located at an upper side and substantially coincides with an upper face of the camera body, and, in a pop-up state, the light-emitting window 43 is directed forwardly.

A driving lever 44 is turnably supported by the supporting shaft 42 of the strobe casing 41. A driving spring 45 comprising a torsion coil spring fitted in the supporting shaft 42 is bridged between the driving lever 44 and the strobe casing 41. The driving lever 44 is formed with a long input hole 44a, and an input pin 46a embedded in a tip end of a pop-up lever 46 is loosely inserted through the driving lever 44.

Figure 8:
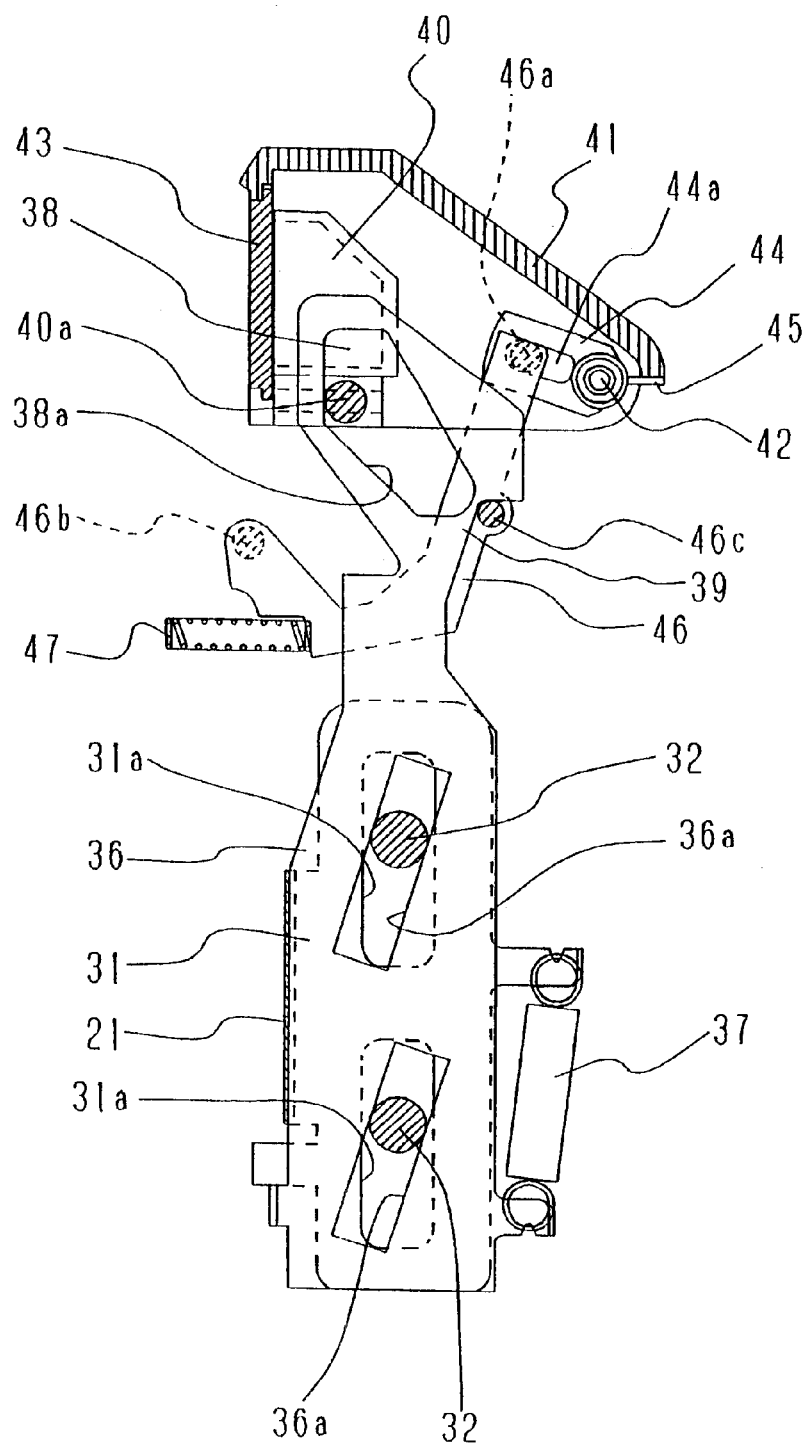
FIG. 8 is a schematic view showing the pop-up action of the pop-up mechanism and showing a state in which the barrel is in the shooting position on the short focus side.

As shown in FIGS. 7 to 9, the pop-up lever 46 is formed into a substantially V-shape, and one end of the V-shape is turnably supported by the camera body through a shaft 46b. A resilience of a driving spring 47 comprising a compression spring is applied to a bent portion of the V-shape so that the pop-up lever 46 is turned in a direction in which the flash light-emitting unit 40 is popped up, i.e., in a direction in which the strobe casing 41 is turned in the clockwise direction around the supporting shaft 42 in FIG. 7. The input pin 46a is embedded in the other end of the V-shape of the pop-up lever 46. A restriction pin 46c is embedded in a portion of the pop up lever 46 between its bent portion and the input pin 46a so that the restriction pin 46c receives the resilience of the driving spring 47 and the restriction pin 46c is pushed into an appropriate position on an outer side edge of the cam. 39 of the driving plate 36.

The flash light-emitting unit 40 is supported along a bottom of the strobe casing 41 such that the flash light-emitting unit 40 can slide in the optical axis. The flash light-emitting unit 40 is biased by biasing means (not shown) so that an input pin 40a embedded in the side of the flash light-emitting unit 40 is located in the cam hole 38, and is pushed within the cam hole 38 by a cam face 38a.

Figure 10:
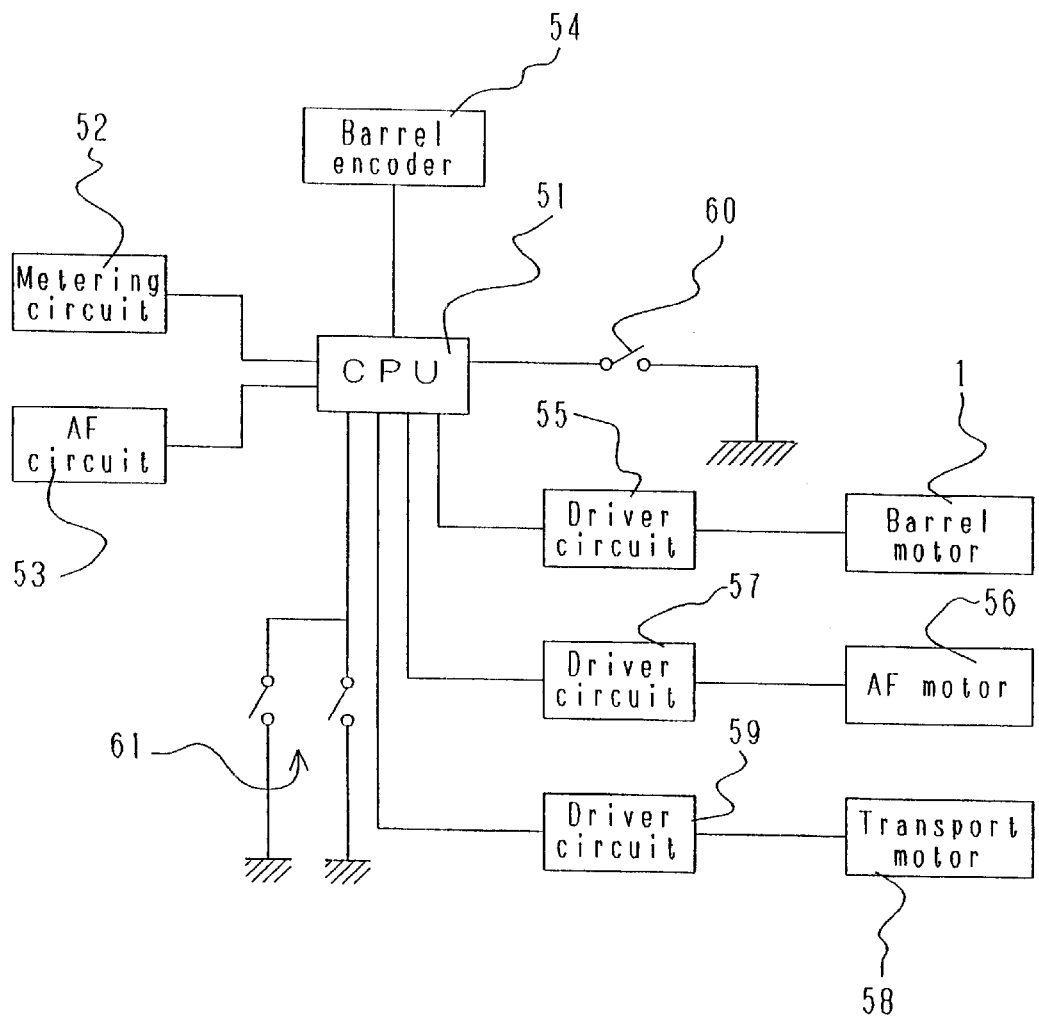
FIG. 10 is a schematic block electrical circuit diagram showing a control system of the camera including the pop-up strobe according to the invention.

FIG. 10 is a block diagram showing a control system for controlling the action of the camera including the pop-up strobe, and mainly comprises a CPU 51. Input to the CPU 51 are metering data concerning brightness of a subject obtained by a metering circuit 52, distance data concerning a distance between the lens and the subject obtained by an auto focus (AF) circuit 53, and positional data concerning an advance/retract position of the barrel obtained by an barrel encoder 54. On the other hand, CPU 51 sends a motor driving signal to a driver circuit 55 which advances or retracts the barrel motor 1, a driver circuit 57 for driving an AF motor 56 which drives an AF of the lens, and a driver circuit 59 for driving a transport motor 58 which winds and rewinds the first frame set of a film. By turning a main switch 60 ON or OFF, the CPU 51 switches a state of camera between a shootable state and a non-shootable state which is selected when the camera is carried. A release switch 61 for allowing the camera to execute a release action is connected to the CPU 51.

Figure 11:
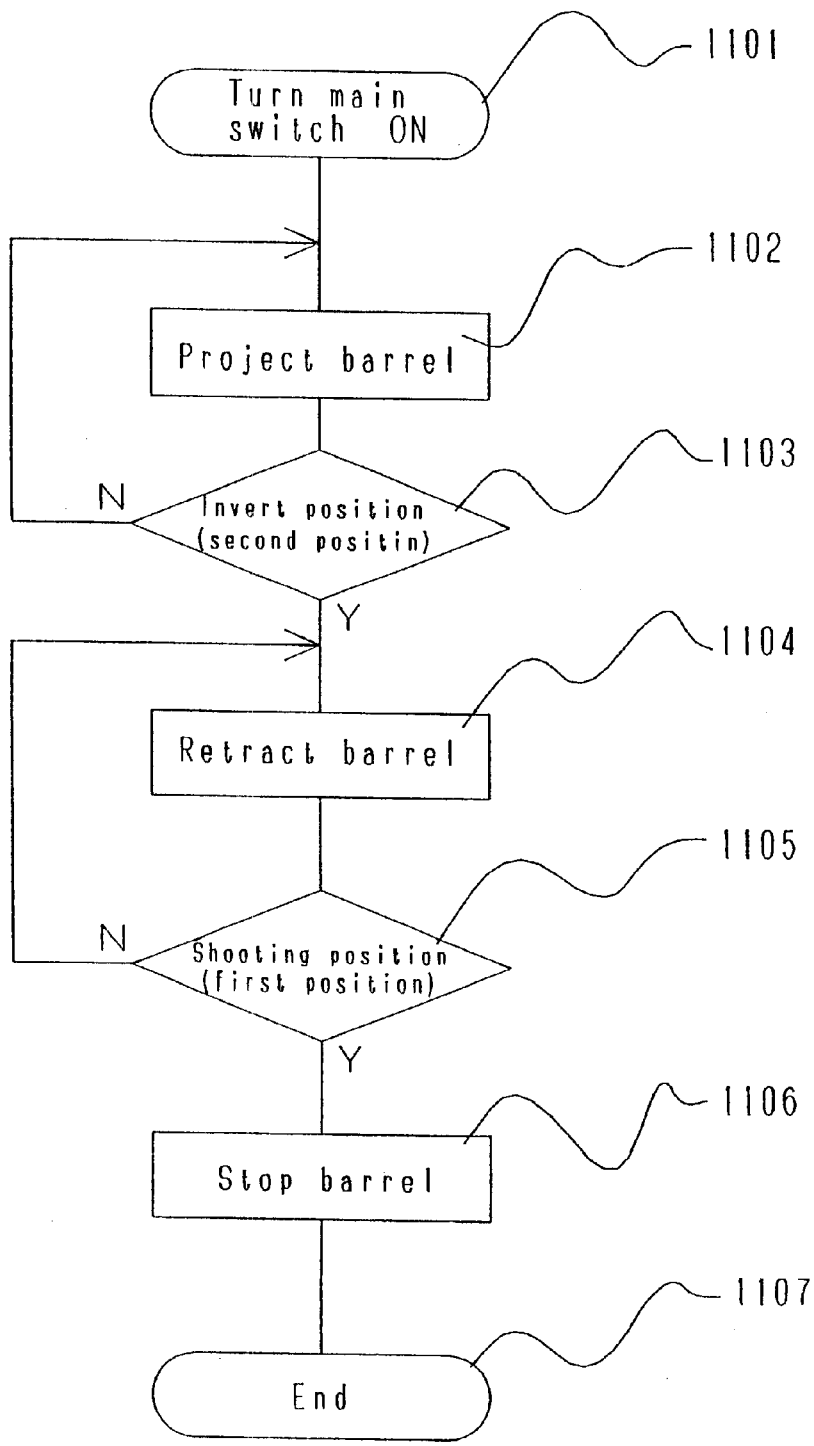
FIG. 11 is a flowchart showing the procedure executed for bringing the camera including the pop-up strobe of the invention into a shootable state.

First, with reference to flowcharts in FIGS. 11 and 12, a procedure for bringing the camera into the shootable state and a procedure for bringing the camera into the non-shootable state will be explained. When the camera is to be brought into the shootable state, a procedure shown in FIG. 11 is executed. If the main switch 60 is turned on (step 1101) (step is abbreviated as "S" hereinafter), a driving signal is sent from the CPU 51 to the driver circuit 55 in order to bring the camera into the shootable state (S1102). An output signal of the barrel encoder 54 is monitored, and it is judged whether the barrel came to an inverted position which corresponds to a second position which will be described later (S1103), and the barrel is advanced to the inverted position.

If the barrel came to the inverted position (YES in S1103), the barrel motor 1 is rotated reversely, thereby transferring the barrel (S1104). An output signal of the barrel encoder 54 is monitored, it is judged whether the barrel came to the shooting position corresponding to a first position which will be described later (S1105) and if YES, (YES in S1105), the operation of the barrel motor 1 is stopped (S1106), the procedure is completed (S1107). In this state, the barrel is in the shooting position, and the camera is in a shooting state. In a state where the barrel is in the shooting position, and if the barrel is of a zoom lens device, the lens is in a wide-angle shooting position, and if the barrel is of a unifocal lens device, the lens is in infinity shooting position.

Figure 12:
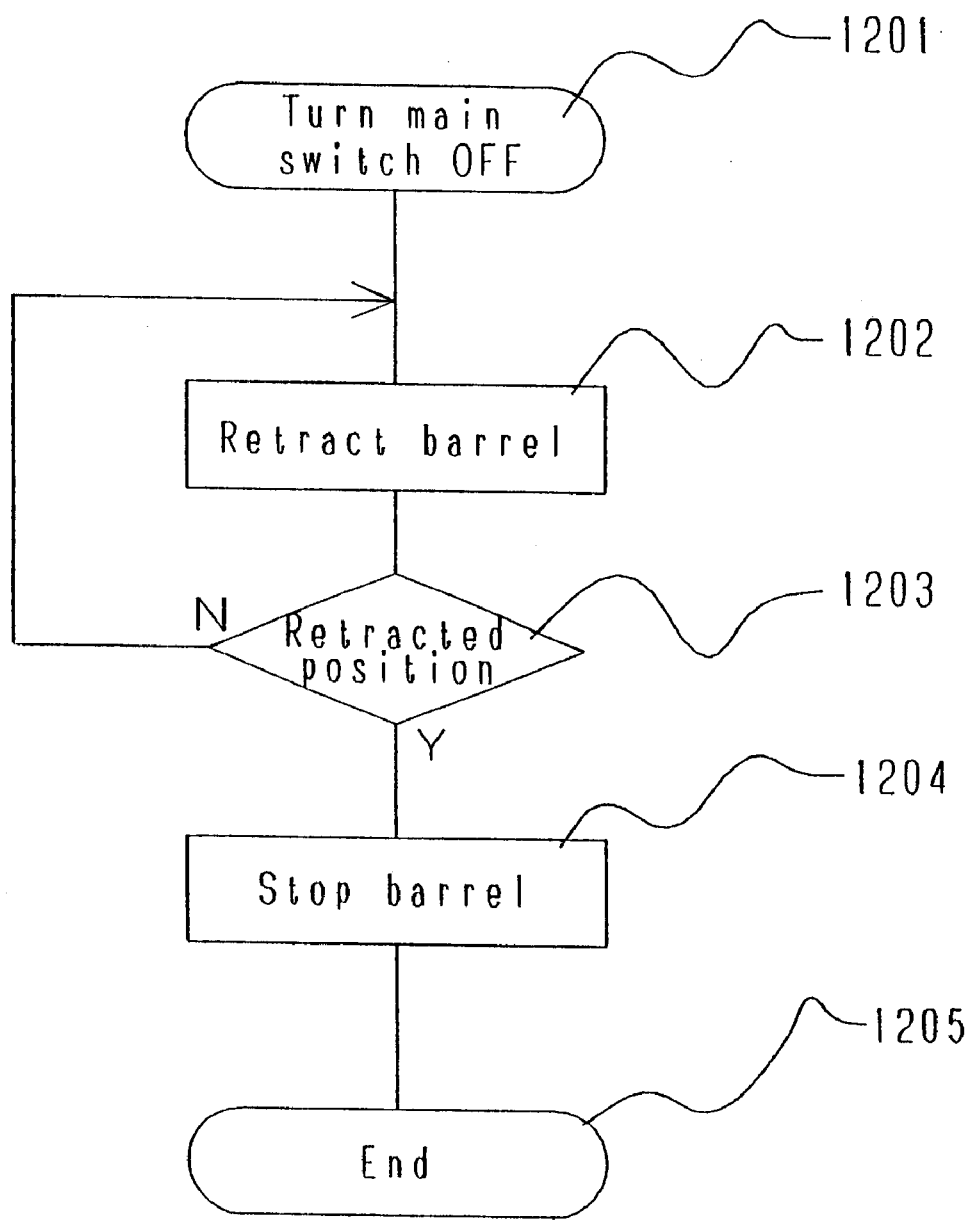
FIG. 12 is a flowchart showing the procedure executed for bringing the camera including the pop-up strobe of the invention into a non-shootable state.

In order to bring the camera into the non-shootable state, the procedure shown in FIG. 12 is executed. If the main switch 60 is turned OFF (S1201), the barrel motor 1 is operated in the direction to retract the barrel, and the barrel is transported (S1202). It is monitored whether the barrel came to the retracted position by the output signal of the barrel encoder 54 (S1203). In a state where the barrel is in the retracted position (YES in S1208), the camera is brought into the non-shootable state, the barrel motor 1 is stopped (S1204), and the main switch OFF procedure is completed (S1205).

Next, the pop-up and pop-down actions will be explained with reference to FIGS. 3 to 6. The actions will be explained with reference to the operating procedure shown in FIGS. 11 and 12.

Figure 3:
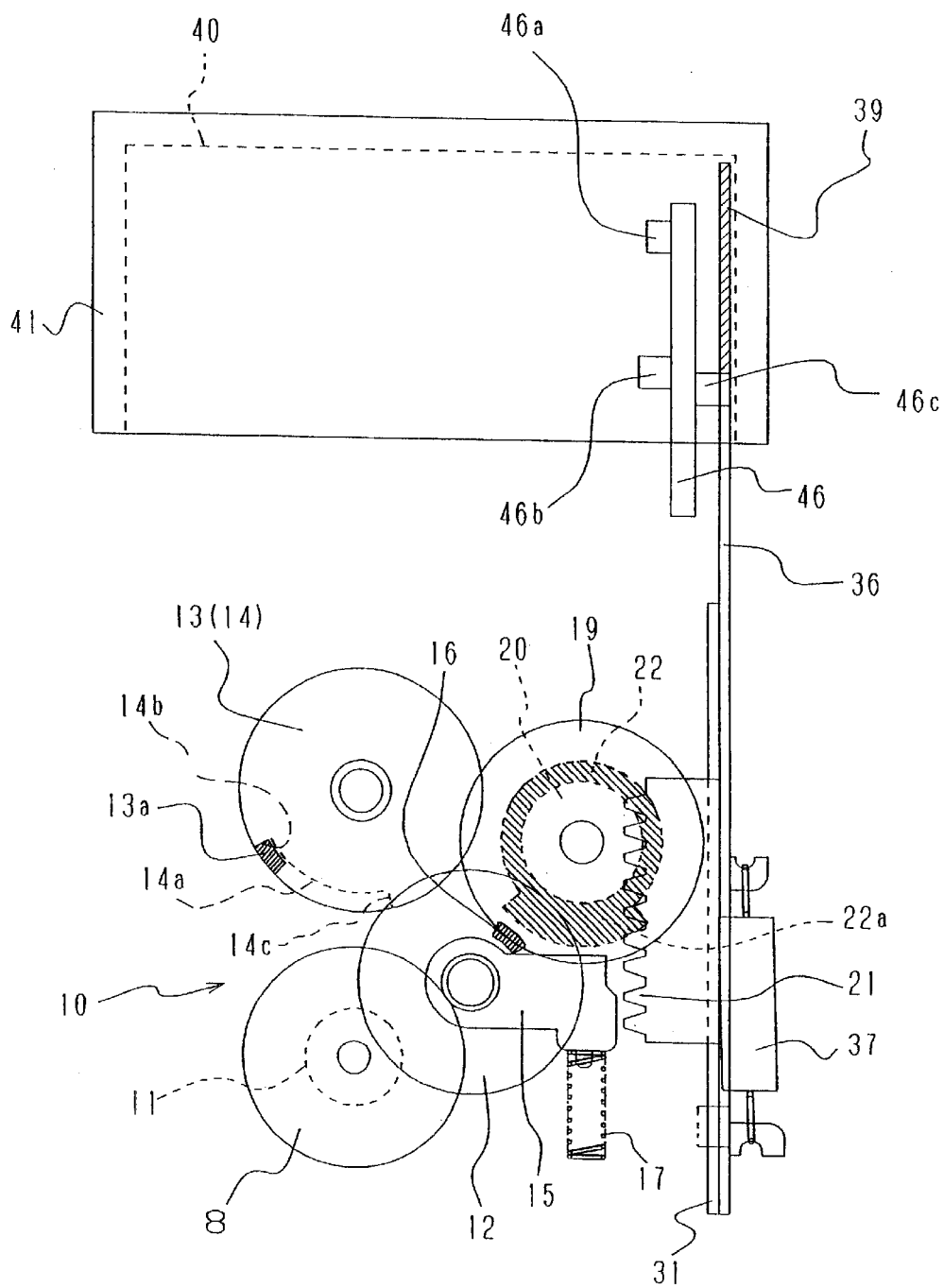
FIG. 3 is a schematic front view showing the pop-up action of the pop-up mechanism and showing a state in which a barrel is retracted.

FIG. 3 shows a state in which the barrel is in its retracted position, and the flash light-emitting unit 40 is in its accommodated position. In this state, the releasing projection 16 of the transmitting gear 12 turns the lock lever 15 against the resilience of the pushing spring 17, and the lock lever 15 is disengaged from the lock portion 22a. The engaging projection 13a of the first interrupting gear 13 is located in the vicinity of one of the end edges 14b of the receiving groove 14a of the second interrupting gear 14. The positions of the first interrupting gear 13 and the second interrupting gear 14 are defined as original positions. In the original positions, the following spring 18 is in its natural state, and the resilience is not accumulated.

In the state shown in FIG. 3, if the main switch 60 is turned ON to bring the camera into the shootable state (S1101), the barrel motor 1 is operated, its output rotation is transmitted to the barrel driving gear 5 provided on the barrel 4, and the predetermined barrel holding the lens is advanced from the retracted position (S1102). At that time, the branch gear 8 is turned in the clockwise direction in FIG. 3 by the output rotation of the barrel motor 1. If the turning force is transmitted to the transmitting gear 12, the transmitting gear 12 is turned in the counterclockwise direction in FIG. 3, and the releasing projection 16 is disengaged from the lock lever 16. Therefore, the lock lever 15 receives the resilience of the pushing spring 17, is turned, and abuts against the outer peripheral face of the lock portion 22a of the lock plate 22. The turning force of the transmitting gear 12 is transmitted to the first interrupting gear 13, and the first interrupting gear 13 is turned in the clockwise direction in FIG. 8. If the engaging projection 13a of the first interrupting gear 13 abuts against the end edge 14b of the receiving groove 14a by this turning motion as shown in FIG. 3, the second interrupting gear 14 is also turned in the same direction. Therefore, the control gear 19 and the driving gear 20 are turned in the counterclockwise direction in FIG. 3 to move the rack 21 which is meshed with the driving gear 20 upward in FIG. 3. By this upward movement of the rack 21, the strobe casing 41 is turned from its accommodated position to the irradiating position, thereby causing the pop-up action of the strobe.

FIG. 7 shows a state in which the strobe is in its accommodated position. From this state, if the rack 21 moves upward, the exchanging plate 31 forming the rack 21 moves upward in FIG. 7. If the exchanging plate 31 moves upward, the driving plate 36 is pulled through the extension spring 37 and moves in the same direction. The guide pins 32 are loosely inserted through the driving holes 36a of the driving plate 36, and the driving holes 36a are formed such that they are inclined with respect to the guide holes 31a of the exchanging plate 31. Therefore, the driving plate 36 moves upward and the driving holes 36a are guided by the guide pins 32 and retracted. If the driving plate 36 moves upward, the restriction pin 46c abuts against the outer periphery of the cam 39 of the driving plate 36, and the restricted pop-up lever 46 is turned in the counterclockwise direction in FIG. 7 around the shaft 46b by the resilience of the driving spring 47. By this turning motion, the input pin 46a is turned in the same direction around the shaft 46b, and the driving lever 44 having the input hole 44a through which the input pin 46a is loosely inserted is turned in the clockwise direction in FIG. 7 around the supporting shaft 42. By the turning motion of the driving lever 44, the driving spring 45 is twisted, its resilience is applied to the strobe casing 41, the strobe casing 41 is turned in the clockwise direction in FIG. 7 around the supporting shaft 42. This turning motion causes the pop-up action of the strobe, and this state is shown in FIGS. 4 and 8.

Figure 4:
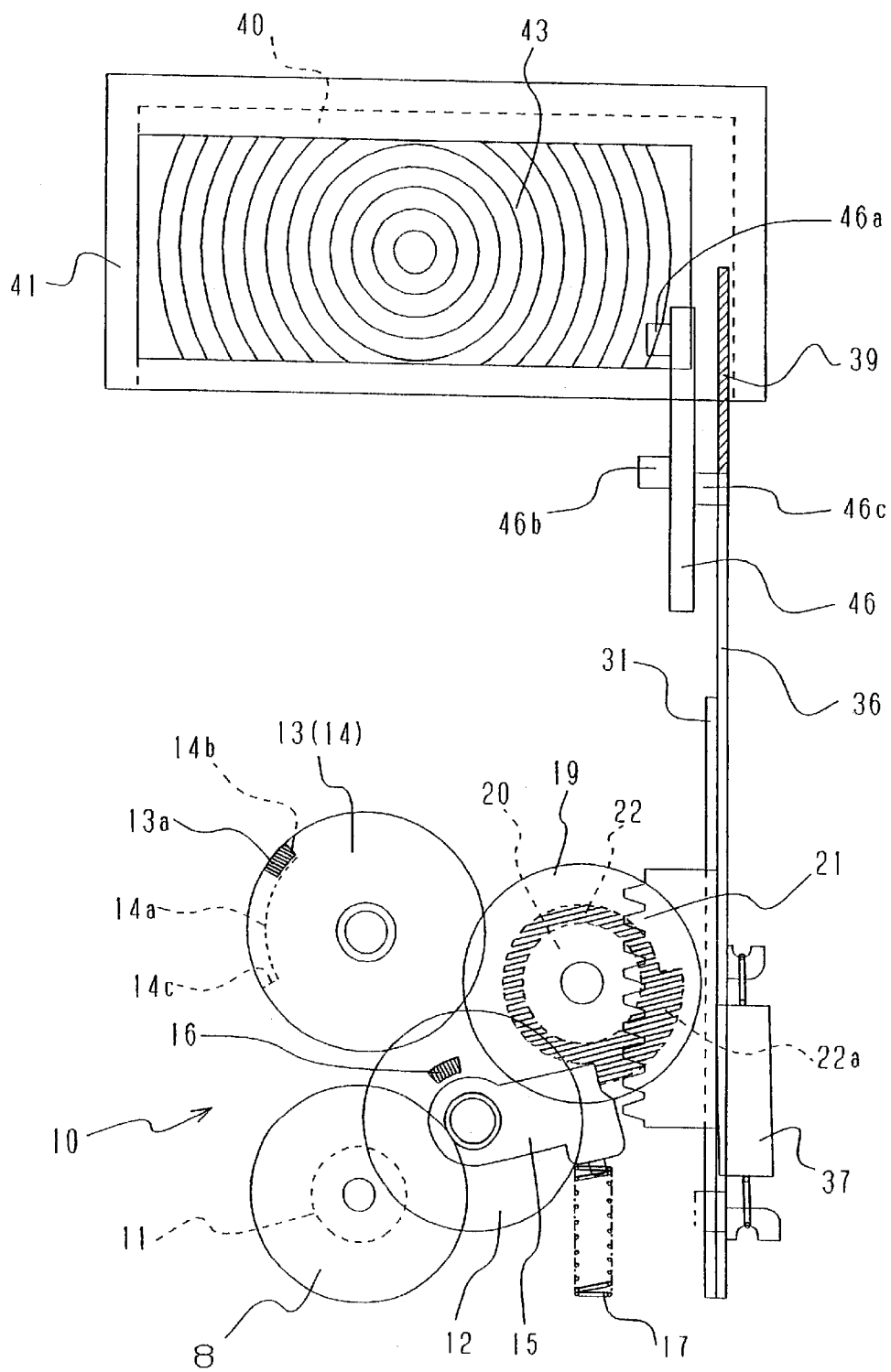
FIG. 4 is a schematic front view showing the pop-up action of the pop-up mechanism and showing a state immediately after the pop-up action was completed.

Positions of the first interrupting gear 13 and the second interrupting gear 14, shown in FIGS. 4 and 8, are defined as second positions. That is, the main switch 60 is turned ON, and the barrel is advanced from its retracted position (S1102). If the barrel advances to the inverted position (YES in S1103), the first interrupting gear 13 and the second interrupting gear 14 move from the original positions to the second positions. In the state where the first interrupting gear 13 and the second interrupting gear 14 are located at the second positions, the engaging projection 13a is in abutment against the end edge 14b of the receiving groove 14a. If the first interrupting gear 13 is turned in the clockwise direction in FIG. 4, the second interrupting gear 14 is also turned in the same direction. The outer peripheral face of the lock portion 22a is released from the lock lever 15, and the lock lever 15 is engaged with the end edge of the lock portion 22a. Therefore, the lock plate 22 and the control gear 19 are prevented from turning in the clockwise direction in FIG. 4.

In the state in which the first interrupting gear 13 and the second interrupting gear 14 are at located at the second positions, the predetermined barrel which has advanced from the retracted position is in the inverted position, which is forward of the wide-angle shooting position on the short focus side. Therefore, the barrel is retracted to the wide-angle shooting position (S1104). If the barrel is retracted to a predetermined position, the branch gear 8 is turned in the counterclockwise direction in FIG. 4. If this turning force is transmitted to the first interrupting gear 13 through the transmitting gear 12, the first interrupting gear 13 is turned in the counterclockwise direction in FIG. 4. At that time, since the engaging projection 13a of the first interrupting gear 13 is turned in the same direction, it is turned in the receiving groove 14a, the turning force of the first interrupting gear 13 is not transmitted to the second interrupting gear 14. Further, since the second interrupting gear 14 which is meshed with the control gear 19 is not turned in the clockwise direction in FIG. 4 because the control gear 19 is prevented from turning in the clockwise direction FIG. 4. Therefore, the following spring 18 interposed between the first interrupting gear 13 and the second interrupting gear 14 is twisted by the turning motion of the first interrupting gear 13, and power is accumulated in the following spring 18.

Figure 5:
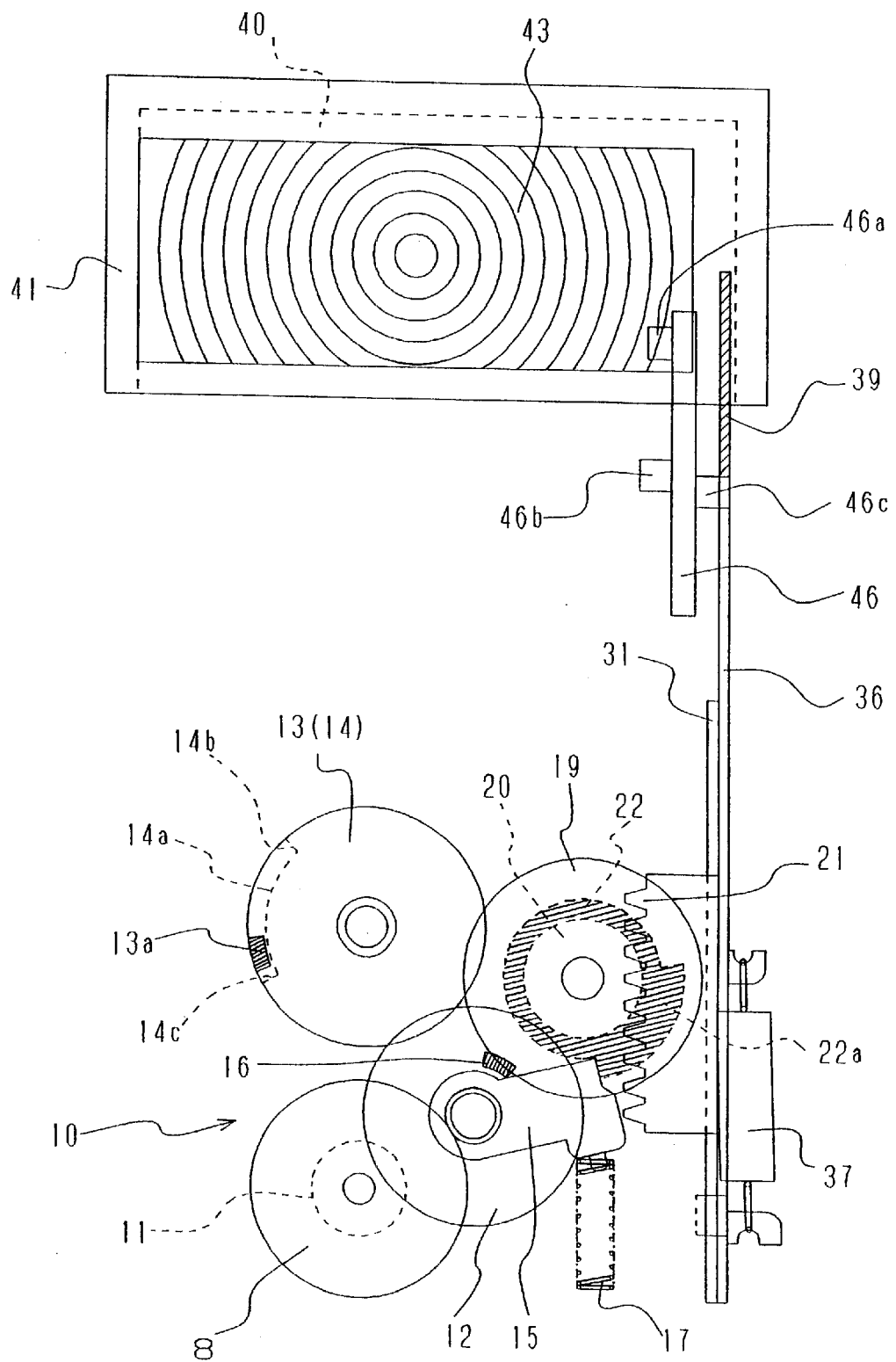
FIG. 5 is a schematic front view showing the pop-up action of the pop-up mechanism and showing a state in which the barrel is in a shooting position on a short focus side.

If the predetermined barrel is retracted to the wide-angle position (S1105), the first interrupting gear 13 is located in the first position as shown in FIG. 5. That is, the engaging projection 13a is located in the medium position of the receiving groove 14a. The releasing projection 16 of the transmitting gear 12 is located in the vicinity of the lock lever 16. In this state, since the barrel is in the shootable position, the camera can be used for shooting. Further, since the flash light-emitting unit 40 is popped up, the strobe can be used as necessary.

When the camera is not used, the main switch 60 is turned OFF (S1201). With this operation, the barrel is retracted from the shootable position to the retracted position (S1202). By the output rotation of the barrel motor 1 for retracting the barrel, the branch gear 8 is turned in the counterclockwise direction from the state shown in FIG. 5. The transmitting gear 12 is turned in the clockwise direction in FIG. 5, the releasing projection 16 pusher, the lock lever 15, and the lock lever 16 is turned in the clockwise direction in FIG. 5 against the resilience of the pushing spring 17. Since the lock lever 15 is disengaged from the lock portion 22a by this turning motion, the control gear 19 and the driving gear 20 are allowed to turn in the clockwise direction in FIG. 5. On the other hand, the power is accumulated in the following spring 18, the first interrupting gear 13 receives the power of the transmitting gear 12 and is turned in the counterclockwise direction in FIG. 5, and the second interrupting gear 14 follows the first interrupting gear 13 and is turned in the same direction by this accumulated force of the following spring 18. By this turning motion, the control gear 19 and the driving gear 20 are turned in the clockwise direction. In a state in which the barrel has been retracted to the retracted position, the first interrupting gear 13 is turned to its original position, and the second interrupting gear 14 which followed the first interrupting gear 13 is also located in its original position as shown in FIG. 3. The driving gear 20 is also in a state shown in FIG. 3. Thus, the flash light-emitting unit 40 is located in its accommodated position.

That is, the rack 21 is lowered from the state shown in FIG. 8 by the turning motion of the driving gear 20, and the exchanging plate 31 is lowered. If the exchanging plate 31 is lowered, the driving plate 36 is pulled by the extension spring 37, the driving holes 36a are guided by the guide pins 32, and the driving plate 36 is advanced while being lowered from a state shown in FIG. 8. If the driving plate 36 is lowered, the cam 39 pushes the restriction pin 46c downward against the resilience of the driving spring 47 so that the pop-up lever 46 is turned in the clockwise direction in FIG. 8 around the shaft 46b, thereby turning the driving lever 44 to which the input pin 46a is connected in the counterclockwise direction in FIG. 8. Therefore, the strobe casing 41 connected to the driving lever 44 through the driving spring 45 is turned in the counterclockwise direction in FIG. 8 around the supporting shaft 42, and the strobe casing 41 is brought into its accommodated position as shown in FIG. 7. The barrel is located in its retracted position (S1203).

Next, the zoom action of the flash light-emitting unit 40 will be explained with reference to FIGS. 5, 6, 8 and 9. A positional relationship of the transmitting gear 12, the first interrupting gear 13, the second interrupting gear 14, the control gear 19, the lock plate 22, and the rack 21 and the like in a state in which a predetermined barrel holding the lens is in the wide-angle shooting position is shown in FIG. 5, end a position of the flash light-emitting unit 40 is shown in FIG. 8.

The barrel is advanced in order to move the lens to the telephotograph shooting position where the focal length is long. The branch gear 8 receives the power of the barrel motor 1 and is turned in the clockwise direction in FIG. 5. The transmitting gear 12 is turned in the counterclockwise direction in FIG. 6, the releasing projection 16 is separated from the lock lever 15 and therefore, the engagement state between the lock lever 15 and the lock portion 22a is maintained. The first interrupting gear 13 is turned in the clock-wise direction in FIG. 6, the engaging projection 13a moves in the receiving groove 14a, and, therefore, the first interrupting gear 13 idles until the engaging projection 13a abuts against the end edge 14b of the receiving groove 14a. At that time, the power accumulated in the following spring 18 disappears, but the power is again accumulated when the first interrupting gear 13 is again turned in the opposite direction. After the engaging projection 13a is turned in the clockwise direction in FIG. 5 and abuts against the end edge 14b of the receiving groove 14a, the second interrupting gear 14 follows the turning motion of the first interrupting gear 13 and is also turned in the clockwise direction in FIG. 6, and, therefore, the control gear 19 meshed with the second interrupting gear 14 and the driving gear 20 which is coaxial with the control gear 19 are turned in the counterclockwise direction in FIG. 5, and the rack 21 meshed with the driving gear 20 is moved upward.

By the upward movement of the rack 21, the exchanging plate 31 is also moved upward, and the driving plate 36 is also moved upward through the extension spring 37. When the driving plate 36 is moved upward, since the driving holes 36a are guided by the guide pins 32, the driving plate 36 is moved upward while being retracted gradually. If the driving plate 36 is moved upward while being retracted, the input pin 40a which is in abutment against the cam face 38a of the cam hole 38 formed in the upper portion of the driving plate 36 is guided by the cam face 38a and moved. Therefore, the flash light-emitting unit 40 included in the input pin 40a slides against the strobe casing 41, and, thus, the flash light-emitting unit 40 is moved in the optical axial direction to assume a state shown in FIG. 9. By this movement, the irradiating angle of the flash light-emitting unit 40 is changed in synchronization with change in focal length. At that time, the first interrupting gear 13 and the like are in a state shown in FIG. 6.

Figure 6:
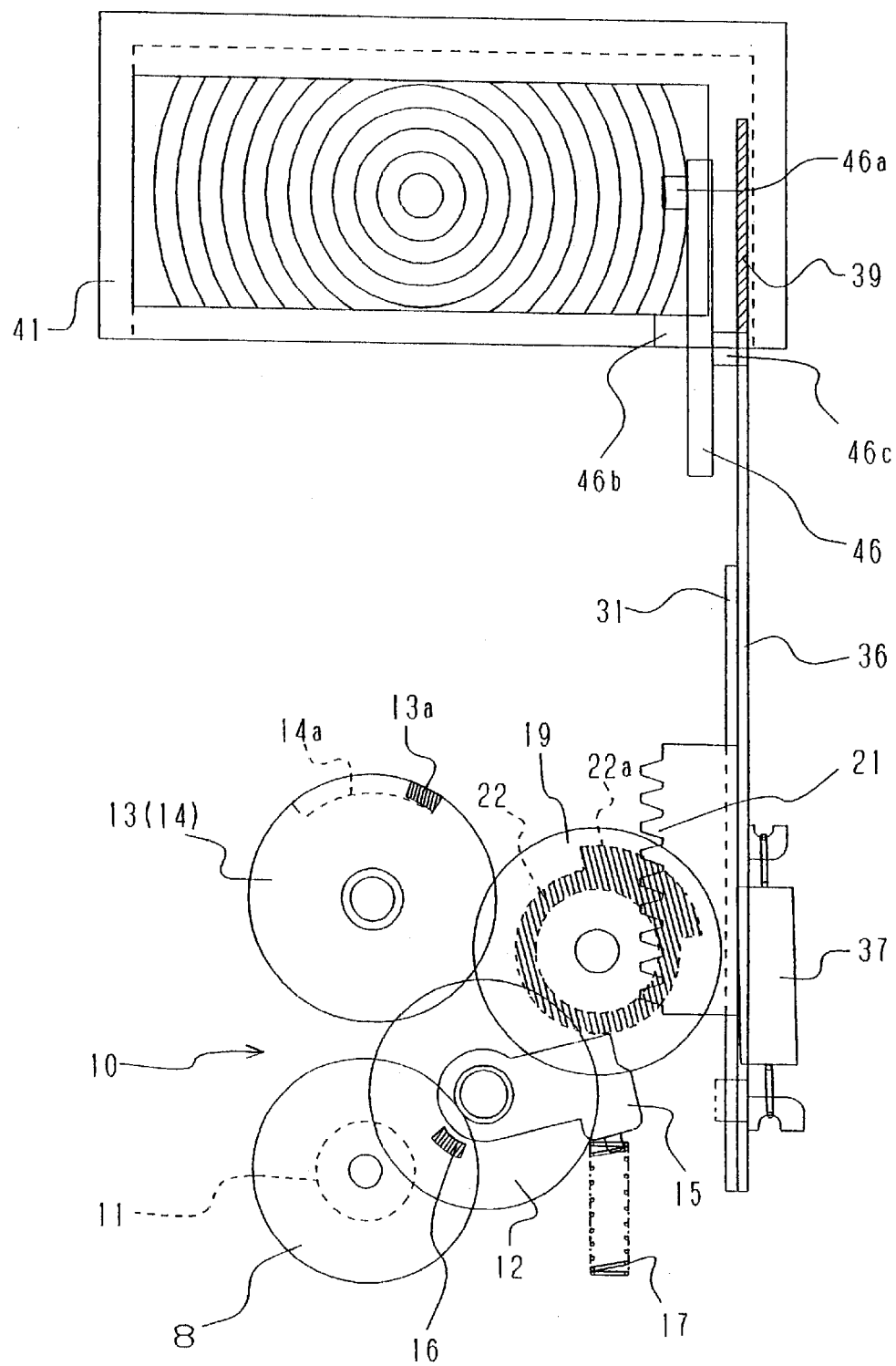
FIG. 6 is a schematic front view showing the pop-up action of the pop-up mechanism and showing a state in which the barrel is in the shooting position on a long focus side.

If the lens is moved from the telephotograph shooting position to the wide-angle shooting position, the branch gear 8 is turned in the counterclockwise direction in FIG. 6. By this turning motion, the first interrupting gear 13 is turned in the counterclockwise direction and the second interrupting gear 14, which is connected to the first interrupting gear 13 through the following spring 18, is also turned in the same direction. By this turning motion of the second interrupting gear 14 in the counterclockwise direction, the control gear 19 and the driving gear 20 are turned in the clockwise direction in FIG. 6, and the rack 21 is lowered. By the lowering motion of the rack 21, the exchanging plate 31 is lowered, and the driving plate 36 is lowered while advancing. Therefore, the flash light-emitting unit 40 is advanced through the input pin 40a which is guided by the cam hole 38 of the driving plate 36.

The control gear 19 is turned in the clockwise direction in FIG. 6 until the lock portion 22a engages the lock lever 16, and, thereafter, the control gear 19 and the second interrupting gear 14 are prevented from turning and only the first interrupting gear 13 is turned in the counterclockwise direction in FIG. 6. This turning motion is allowed by a motion that the engaging projection 13a moves in the receiving groove 14a. At that time, the power is accumulated in the following spring 18. The action for retracting the barrel into the retracted position is as described above.

Although the above embodiment has been explained based on a case in which the camera includes the zoom lens device, it is possible to apply this pop-up strobe to a camera having a unifocal lens device. When this pop-up strobe is applied to a camera having a unifocal lens device, it is possible to use a mechanism which advances the barrel from the retracted position beyond the infinity shooting position which is the shootable position, and the barrel can be moved to a point-blank shooting position utilizing this mechanism. That is, when the camera is used for shooting, the barrel is advanced from the retracted position to the point-blank shooting position beyond the infinity shooting position and then, the barrel is retracted to the infinity shooting position and brought on standby for shooting.

As explained above, according to the camera including the pop-up strobe of the present invention, since the driving force of the pop-up mechanism is branched from the medium portion of the power transmitting path from the driving source to the barrel, it is unnecessary to separately prepare additional driving source for the pop-up mechanism. Therefore, the camera can be reduced in both weight and size.

According to the camera including the pop-up strobe of the invention described in the second aspect, the flash light-emitting unit can be provided with a sufficient driving distance when the barrel is popped up by moving the barrel forward from the shooting position. Therefore, a distance between the retracted position and the shooting position can be shortened, and this prevents the camera from being thickened.

According to the camera including the pop-up strobe of the invention described in the third aspect, the zoom device having the mechanism for advancing the lens forward from the wide-angle shooting position is applied to the camera. Therefore, it is unnecessary to separately prepare a mechanism for advancing the barrel forward from the shooting position, and the camera can easily be improved utilizing the existing structure.

According to the camera including the pop-up strobe of the invention described in the fourth aspect, the power accumulated in the power accumulating means is utilized for popping down the strobe light-emitting unit. Therefore, it is possible to reliably pop-down the strobe light-emitting unit irrespective of length of the moving distance of the barrel from the shooting position to the retracted position by accumulating the power in the power accumulating means halfway through the pop-up action. Further, since the power is accumulated halfway through the pop-up action, the power accumulating means is usually free. Therefore, it is possible to prevent the power accumulating means from becoming fatigued.

According to the camera including the pop-up strobe of the invention described in the fifth aspect, after the barrel was moved forward from the shooting position, the barrel is retreated to the shooting position, and the power is accumulated in the power accumulating means. When the barrel is retracted from the shooting position to the retracted position, the strobe light-emitting unit is popped down by the power accumulated in the power accumulating means. Therefore, the barrel can be moved forward freely. Thus, the barrel can be advanced from the shooting position to an arbitrary position, and the focal length of the lens held by the barrel can be changed. Further, since the moving preventing means is not released by the power acting when the barrel is moved forward from the shooting position, the power caused by this movement can easily be utilized for the zooming action of the flash light-emitting unit.

According to the camera including the pop-up strobe of the invention described in the sixth aspect, since the space for disposing the interrupting power transmitting element can be reduced to a minimum, it is possible to easily reduced the camera in size.

It will become apparent to those skilled in the art that various modifications to the embodiments of the invention as described herein can be made without departing from the spirit or scope of the invention as defined by the amended claims.

The invention claimed is:

1. A camera including a pop-up strobe, comprising:
   a retracting mechanism coupled to a driving source for moving a barrel between a retracted position and a shooting position;
   a flash light-emitting unit and a pop-up mechanism for moving the flash light-emitting unit between an accommodated position and an irradiating position;
   power branching structure provided in an intermediate portion of a barrel-power transmitting path between said driving source to said barrel;
   a pop-up power transmitting path coupled to said power branching structure for transmitting power of said driving source from said power branching structure to a driving mechanism of said pop-up mechanism, wherein said pop-up power transmitting path is provided with power accumulating means;
   said power accumulating means accumulates power halfway through said pop-up action; and
   when said flash light-emitting unit is popped down from said irradiating position to said accommodated position, the pop-down action is carried out by the accumulated power.

2. A camera including a pop-up strobe, comprising:
   a retracting mechanism including a drive source for moving a barrel between a, retracted position and a shooting position;
   a pop-up mechanism for moving a flash light-emitting unit between an accommodated position and an irradiating position;
   power branching structure provided in an intermediate portion of a barrel-power transmitting path between said driving source to said barrel; and
   a pop-up power transmitting path for transmitting power of said driving source from said power branching structure to a driving mechanism of said pop-up mechanism, wherein when said barrel is moved from said retracted position to said shooting position, said barrel is further moved forward from said shooting position, a pop-up action for moving said flash light-emitting unit from said accommodated position to said irradiating position is carried out, and after said pop-up action is completed, said barrel is retracted and moved to said shooting position.

3. A camera including a pop-up strobe according to claims 2, wherein:
   a constituent element of said pop-up power transmitting path is provided with power accumulating means;
   said power accumulating means accumulates power halfway through said pop-up action; and
   when said flash light-emitting unit is popped down from said irradiating position to said accommodated position, the pop-down action is carried out by the accumulated power.

4. A camera including a pop-up strobe, comprising:
   a retracting mechanism including a drive source for moving a barrel between a, retracted position and a shooting position;
   a pop-up mechanism for moving a flash light-emitting unit between an accommodated position and an irradiating position;
   power branching structure provided in an intermediate portion of a barrel-power transmitting path between said driving source to said barrel;
   a pop-up power transmitting path for transmitting power of said driving source from said power branching structure to a driving mechanism of said pop-up mechanism, wherein when said barrel is moved from said retracted position to said shooting position, said barrel is further moved forward from said shooting position, a pop-up action for moving said flash light-emitting unit from said accommodated position to said irradiating position is carried out, and after said pop-up action is completed, said barrel is retracted and moved to said shooting position;
   a pair of interrupting power transmitting elements which are provided in said pop-up power transmitting path, and which are capable of relative movement and mutually transmitting a moving power;
   non-interference means for cutting the transmission of said moving force between said pair of interrupting power transmitting elements and moving-preventing means for preventing a second interrupting power transmitting element of said pair of interrupting power transmitting elements disposed closer to said flash light-emitting unit from moving in a predetermined direction, wherein said power accumulating means is interposed between said pair of interrupting power transmitting elements, when a first interrupting power transmitting element disposed closer to said power branching means is moved from its original position to a second position in a normal direction, said second interrupting power transmitting element is moved from its original position to a second position, and said flash light-emitting unit is moved to said irradiating position;
   said second interrupting power transmitting element is prevented from moving toward said original position by said moving-preventing means in a state in which said second interrupting power transmitting element is in said second position;

said power accumulating means accumulates power by moving said first interrupting power transmitting element from said second position to a first position in the opposite direction;

wherein when the moving-preventing operation of said moving-preventing means is acting, a movement of said first interrupting power transmitting element from said first position to said second position is not transmitted to said second interrupting power transmitting element by said non-interference means;

a restraint of said second interrupting power transmitting element by said moving preventing means is released by moving said first interrupting power transmitting element from said first position toward said original position in the opposite direction, thereby allowing said second interrupting power transmitting element to move, said flash light-emitting unit is moved to said accommodated position by said power accumulating means, in a state in which said first interrupting power transmitting element and said second interrupting power transmitting element are in their original positions, said barrel is in said retracted position, and said flash light-emitting unit is in said accommodated position; and wherein said camera is brought into a shootable state when said first interrupting power transmitting element is in said first position.

5. A camera including a pop-up strobe according to claim 4, wherein one of said pair of interrupting power transmitting elements is provided with a projection, and the other is provided with a receiving groove for accommodating said projection, and said non-interference means does not transmit the power between said interrupting power transmitting elements when said projection is not in engagement with any of the ends of said receiving groove.

6. A camera including a pop-up strobe according to claim 5, wherein said power accumulating means comprises a torsion coil spring whose opposite ends are respectively engaged with ends of said interrupting power transmitting elements.

7. A camera including a pop-up strobe according to claim 4, wherein said power accumulating means comprises a torsion coil spring whose opposite ends are respectively engaged with ends of said interrupting power transmitting elements.

8. A camera including a pop-up strobe according to claim 4, wherein said pair of interrupting power transmitting elements comprise power transmitting elements which are capable of turning mutually and coaxially.

9. A camera including a pop-up strobe according to claim 8, wherein one of said pair of interrupting power transmitting elements is provided with a projection, and the other is provided with a receiving groove for accommodating said projection, and said non-interference means does not transmit the power between said interrupting power transmitting elements when said projection is not in engagement with any of the ends of said receiving groove.

10. A camera including a pop-up strobe according to claim 9, wherein said power accumulating means comprises a torsion coil spring whose opposite ends are respectively engaged with ends of said interrupting power transmitting elements.

11. A camera including a pop-up strobe according to claims 8, wherein said power accumulating means comprises a torsion coil spring whose opposite ends are respectively engaged with ends of said interrupting power transmitting elements.

12. A camera including a pop-up strobe comprising:

a zoom lens device including a retracting mechanism and a driving source for moving a barrel between a retracted position, a wide-angle shooting position, and a telephotograph shooting position;

a pop-up mechanism for moving a flash light-emitting unit between an accommodated position and an irradiating position;

power branching structure provided in an intermediate portion of a barrel-power transmitting path between said driving source to said barrel; and a pop-up power transmitting path for transmitting power of said driving source from said power branching structure to a driving mechanism of said pop-up mechanism, wherein when said barrel is moved from said retracted position to said wide-angle shooting position, said barrel is further moved forward from said wide-angle shooting position, a pop-up action for moving said flash light-emitting unit from said accommodated position to said irradiating position is carried out, and after said pop-up action is completed, said barrel is retracted and moved to said wide angle shooting position.

13. A camera including a pop-up strobe according to claims 12, wherein:

a constituent element of said pop-up power transmitting path is provided with power accumulating means;

said power accumulating means accumulates power halfway through said pop-up action; and when said flash light-emitting unit is popped down from said irradiating position to said accommodated position, the pop-down action is carried out by the accumulated power.

14. A camera including a pop-up strobe comprising:

a zoom lens device including a retracting mechanism and a driving source for moving a barrel between a retracted position, a wide-angle shooting position, and a telephotograph shooting position;

a pop-up mechanism for moving a flash light-emitting unit between an accommodated position and an irradiating position;

power branching structure provided in an intermediate portion of a barrel-power transmitting path between said driving source to said barrel; and a pop-up power transmitting path for transmitting power of said driving source from said power branching structure to a driving mechanism of said pop-up mechanism, wherein when said barrel is moved from said retracted position to said wide-angle shooting position, said barrel is further moved forward from said wide-angle shooting position, a pop-up action for moving said flash light-emitting unit from said accommodated position to said irradiating position is carried out, and after said pop-up action is completed, said barrel is retracted and moved to said wide-angle shooting position;

a pair of interrupting power transmitting elements which are provided in said pop-up power transmitting path, and which are capable of relative movement and mutually transmitting a moving power;

non-interference means for cutting the transmission of said moving force between said pair of interrupting power transmitting elements and moving-preventing means for preventing a second interrupting power transmitting element of said pair of interrupting power transmitting elements disposed closer to said flash light-emitting unit from moving in a predetermined direction, wherein said power accumulating means is interposed between said pair of interrupting power transmitting elements, when a first interrupting power transmitting element disposed closer to said power branching means is moved from its original position to a second position in a normal direction, said second interrupting power transmitting element is moved from its original position to a second position, and said flash light-emitting unit is moved to said irradiating position;

said second interrupting power transmitting element is prevented from moving toward said original position by said moving-preventing means in a state in which said second interrupting power transmitting element is in said second position;

said power accumulating means accumulates power by moving said first interrupting power transmitting element from said second position to a first position in the opposite direction;

wherein when the moving-preventing operation of said moving-preventing means is acting, a movement of said first interrupting power transmitting element from said first position to said second position is not transmitted to said second interrupting power transmitting element by said non-interference means;

a restraint of said second interrupting power transmitting element by said moving-preventing means is released by moving said first interrupting power transmitting element from said first position toward said original position in the opposite direction, thereby allowing said second interrupting power transmitting element to move, said flash light-emitting unit is moved to said accommodated position by said power accumulating means, in a state in which said first interrupting power transmitting element and said second interrupting power transmitting element are in their original positions, said barrel is in said retracted position, and said flash light-emitting unit is in said accommodated position; and wherein said camera is brought into a shootable state when said first interrupting power transmitting element is in said first position.

15. A camera including a pop-up strobe according to claim 14, wherein one of said pair of interrupting power transmitting elements is provided with a projection, and the other is provided with a receiving groove for accommodating said projection, and said non-interference means does not transmit the power between said interrupting power transmitting elements when said projection is not in engagement with any of the ends of said receiving groove.

16. A camera including a pop-up strobe according to claim 15, wherein said power accumulating means comprises a torsion coil spring whose opposite ends are respectively engaged with ends of said interrupting power transmitting elements.

17. A camera including a pop-up strobe according to claim 15, wherein said power accumulating means comprises a torsion coil spring whose opposite ends are respectively engaged with ends of said interrupting power transmitting elements.

18. A camera including a pop-up strobe according to claims 14, wherein said power accumulating means comprises a torsion coil spring whose opposite ends are respectively engaged with ends of said interrupting power transmitting elements.

19. A camera including a pop-up strobe according to claim 14, wherein said pair of interrupting power transmitting elements comprise power transmitting elements which are capable of turning mutually and coaxially.

20. A camera including a pop-up strobe according to claim 19, wherein one of said pair of interrupting power transmitting elements is provided with a projection, and the other is provided with a receiving groove for accommodating said projection, and said non-interference means does not transmit the power between said interrupting power transmitting elements when said projection is not in engagement with any of the ends of said receiving groove.

21. A camera including a pop-up strobe according to claims 19, wherein said power accumulating means comprises a torsion coil spring whose opposite ends are respectively engaged with ends of said interrupting power transmitting elements.

22. A camera including a pop-up strobe comprising:

a zoom lens device including a retracting mechanism and a driving source for moving a barrel between a retracted position, a wide-angle shooting position, and a telephotograph shooting position;

a pop-up mechanism for moving a flash light-emitting unit between an accommodated position and an irradiating position;

power branching structure provided in an intermediate portion of a barrel-power transmitting path between said driving source to said barrel;

a pop-up power transmitting path for transmitting power of said driving source from said power branching structure to a driving mechanism of said pop-up mechanism, wherein when said barrel is moved from said retracted position to said wide-angle shooting position, said barrel is further moved forward from said wide-angle shooting position, a pop-up action for moving said flash light-emitting unit from said accommodated position to said irradiating position is carried out, and after said pop-up action is completed, said barrel is retracted and moved to said wide-angle shooting position;

a constituent element of said pop-up power transmitting path is provided with power accumulating means;

said power accumulating means accumulates power halfway through said pop-up action such that when said barrel is popped down from said irradiating position to said accommodated position, the pop-down action is carried out by the accumulated power;

a pair of interrupting power transmitting elements which are provided in said pop-up power transmitting path, and which are capable of relative movement and mutually transmitting a moving power;

non-interference means for cutting the transmission of said moving force between said pair of interrupting power transmitting elements and moving-preventing means for preventing a second interrupting power transmitting element of said pair of interrupting power transmitting elements disposed closer to said flash light-emitting unit from moving in a predetermined direction, wherein said power accumulating means is interposed between said pair of interrupting power transmitting elements, when a first interrupting power transmitting element disposed closer to said power branching means is moved from its original position to a second position in a normal direction, said second interrupting power transmitting element is moved from its original position to a second position, and said flash light-emitting unit is moved to said irradiating position;

said second interrupting power transmitting element is prevented from moving toward said original position by said moving-preventing means in a state in which said second interrupting power transmitting element is in said second position;

said power accumulating means accumulates power by moving said first interrupting power transmitting element from said second position to a first position in the opposite direction;

wherein when the moving-preventing operation of said moving-preventing means is acting, a movement of said first interrupting power transmitting element from said first position to said second position is not transmitted to said second interrupting power transmitting element by said non-interference means;

a restraint of said second interrupting power transmitting element by said moving preventing means is released by moving said first interrupting power transmitting element from said first position toward said original position in the opposite direction, thereby allowing said second interrupting power transmitting element to move, said flash light-emitting unit is moved to said accommodated position by said power accumulating means, in a state in which said first interrupting power transmitting element and said second interrupting power transmitting element are in their original positions, said barrel is in said retracted position, and said flash light-emitting unit is in said accommodated position; and wherein said camera is brought into a shootable state when said first interrupting power transmitting element is in said first position.

23. A camera including a pop-up strobe according to claim 22, wherein one of said pair of interrupting power transmitting elements is provided with a projection, and the other is provided with a receiving groove for accommodating said projection, and said non-interference means does not transmit the power between said interrupting power transmitting elements when said projection is not in engagement with any of the ends of said receiving groove.

24. A camera including a pop-up strobe according to claim 23, wherein said power accumulating means comprises a torsion coil spring whose opposite ends are respectively engaged with ends of said interrupting power transmitting elements.

25. A camera including a pop-up strobe according to claims 22, wherein said power accumulating means comprises a torsion coil spring whose opposite ends are respectively engaged with ends of said interrupting power transmitting elements.

26. A camera including a pop-up strobe according to claim 22, wherein said pair of interrupting power transmitting elements comprise power transmitting elements which are capable of turning mutually and coaxially.

27. A camera including a pop-up strobe according to claim 26, wherein one of said pair of interrupting power transmitting elements is provided with a projection, and the other is provided with a receiving groove for accommodating said projection, and said non-interference means does not transmit the power between said interrupting power transmitting elements when said projection is not in engagement with any of the ends of said receiving groove.

28. A camera including a pop-up strobe according to claim 27, wherein said power accumulating means comprises a torsion coil spring whose opposite ends are respectively engaged with ends of said interrupting power transmitting elements.

29. A camera including a pop-up strobe according to claims 26, wherein said power accumulating means comprises a torsion coil spring whose opposite ends are respectively engaged with ends of said interrupting power transmitting elements.

30. A pop-up method of controlling the strobe of a camera having a pop-up strobe, comprising the steps of:

moving a barrel between a retracted position and a shooting position by a power output from a driving source;

moving a flash light-emitting unit from an accommodated position to an irradiating position in synchronization with the moving action of said barrel;

advancing said barrel slightly from said shooting position as said flash light-emitting unit is moved to said irradiating position with this advancing action; and retracting said barrel to said shooting position.

* * * * *

UNITED STATES PATENT AND TRADEMARK OFFICE
CERTIFICATE OF CORRECTION

PATENT NO. : 6,374,051 B1
DATED : April 16, 2002
INVENTOR(S) : Yamane

It is certified that error appears in the above-identified patent and that said Letters Patent is hereby corrected as shown below:

<u>Title page,</u>
Item [57], ABSTRACT,
Line 2, "&" should be -- a --.

<u>Column 1,</u>
Line 35, "includes" should be -- include --.

<u>Column 3,</u>
Line 57, "tie" should be -- the --.
Line 59, "w" should be -- with --.

<u>Column 4,</u>
Line 31, "move" should be -- moving --.
Line 57, after "second position" insert -- is not --.

<u>Column 7,</u>
Line 61, after "comes" insert -- to --.

<u>Column 9,</u>
Line 41, after "cam" delete -- . --.
Line 67, after "CPU 51." insert the following paragraph -- The operation of the camera including the pop-up strobe embodiment of the present invention structured as described above will be explained. --

<u>Column 11,</u>
Line 64, after "are" delete -- at -- (first occurrence).

<u>Column 13,</u>
Line 18, "end" should be -- and --.
Line 29, "clock-wise" should be -- clockwise --.

<u>Column 15,</u>
Line 32, "amended" should be -- appended --.
Line 60, delete ",".

<u>Column 16,</u>
Line 12, "claims 2" should be -- claim 2 --.

<u>Column 17,</u>
Line 66, "claims 8" should be -- claim 8 --.

UNITED STATES PATENT AND TRADEMARK OFFICE
CERTIFICATE OF CORRECTION

PATENT NO.   : 6,374,051 B1
DATED         : April 16, 2002
INVENTOR(S)  : Yamane It is certified that error appears in the above-identified patent and that said Letters Patent is hereby corrected as shown below:

Column 18,
Line 28, "claims 12" should be -- claim 12 --.

Column 19,
Line 66, "claims 14" should be -- claim 14 --.

Column 20,
Line 16, "claims 19" should be -- claim 19 --.

Column 22,
Line 5, "claims 22" should be -- claim 22 --.
Line 28, "claims 26" should be -- claim 26 --.

Signed and Sealed this

Twenty-first Day of January, 2003

JAMES E. ROGAN
*Director of the United States Patent and Trademark Office*